(12) United States Patent
Sranka

(10) Patent No.: US 7,862,088 B2
(45) Date of Patent: Jan. 4, 2011

(54) SWIVEL

(76) Inventor: Jaroslav Sranka, Södra Storgatan 5, S-590 80 Södra (SE)

( * ) Notice: Subject to any disclaimer, the term of this patent is extended or adjusted under 35 U.S.C. 154(b) by 0 days.

(21) Appl. No.: 10/669,418

(22) Filed: Sep. 25, 2003

(65) Prior Publication Data

US 2004/0100092 A1 May 27, 2004

(30) Foreign Application Priority Data

Mar. 28, 2001 (SE) .................................... 0101116

(51) Int. Cl.
*F16L 27/00* (2006.01)
(52) U.S. Cl. .................. 285/272; 285/121.3; 285/121.5
(58) Field of Classification Search .................. 403/78, 403/15, 164, 52, 1, 31, 34, 37–39; 137/560, 137/580; 439/13, 6, 20; 285/276, 278, 149.1, 285/152.1, 153.1, 121.3, 121.5, 272
See application file for complete search history.

(56) References Cited

U.S. PATENT DOCUMENTS

| 2,641,629 | A | * | 6/1953 | Bennett, Jr. .................. 174/86 |
| 2,832,374 | A | | 4/1958 | November |
| 3,012,801 | A | * | 12/1961 | Cole ............................. 403/52 |
| 3,026,129 | A | * | 3/1962 | Courtot et al. ............... 285/184 |
| 3,477,746 | A | * | 11/1969 | Watson ........................ 285/119 |
| 4,174,127 | A | * | 11/1979 | Carn et al. ................... 285/190 |
| 4,183,559 | A | * | 1/1980 | Stafford et al. .............. 285/190 |
| 4,193,616 | A | * | 3/1980 | Sarson et al. ................. 285/39 |
| 4,214,780 | A | | 7/1980 | Grace |
| 6,094,922 | A | * | 8/2000 | Ziegler ........................ 62/50.7 |
| 6,234,417 | B1 | * | 5/2001 | Sauder et al. ............... 242/381 |
| 6,338,505 | B1 | * | 1/2002 | Korsgaard ................... 285/119 |

FOREIGN PATENT DOCUMENTS

DE 3015809 10/1981

* cited by examiner

*Primary Examiner*—Victor MacArthur
(74) *Attorney, Agent, or Firm*—Capitol City TechLaw

(57) ABSTRACT

A swivel includes two coaxial, mutually rotatable members and is provided with flexible hoses or cables connected between the rotatable members for transferring operating and/or controlling media or the like between the rotatable members. The flexible hoses or cables are connected to the rotatable members by use of quick-couplings.

7 Claims, 1 Drawing Sheet

SWIVEL

TECHNICAL FIELD

The present invention relates to a swivel comprising two coaxial, mutually rotatable members and having means for transferring operating and/or controlling media or the like between the members.

BACKGROUND OF THE INVENTION

A typical use for a swivel of the above type is in an industrial robot, and the invention will be exemplified by reference to this use. However, the invention is not so limited; it may be utilized in many applications within the scope of the appended claims.

In a swivel media like compressed air, cooling liquid, lubricant, electric power, and/or control signals, i e generally fluids and or electricity, are to be transferred between the two coaxial, mutually rotatable members.

With regard to fluid transfer the two members are rotating against each other, and the cooperating surfaces of the members are provided with mutually corresponding circular grooves, so that fluid may be transferred from one member to the other irrespective of their mutual angular position. A known problem with this type is the sealing between the members and around the grooves.

Electric transfer may be provided by slip ring devices in or at the swivel. These devices, which are separate from the fluid transfer, are susceptible of wear and negative influences of dirt, dust and the like.

A swivel of this type is relatively complicated and therefore time-consuming and expensive to manufacture. In spite of this the number of different fluids that can be transferred is limited.

Due to the complicated construction it is difficult to service the device, and the life-span is relatively short.

THE INVENTION

The problems and disadvantages with previous swivels is according to the invention removed in that said means are flexible hoses or cables between the members.

The length of the hoses or cables is chosen so as to allow the desired mutual rotation of the two swivel members, normally not exceeding a full revolution.

It may be of advantage if the hoses or cables are elastically extensible, preferably of spiral type.

By the invention a simpler and cheaper design is obtained. The fluids and the electricity are transferred by principally the same devices, which means that the service is greatly simplified and the service time shortened. Besides, the over-all life-span is greatly improved.

The exchange of possibly damaged hoses or cables is facilitated by the use of quick-couplings for them in the members.

The number of fluids and signals that can be transferred can be increased in the design according to the invention. This may be of importance for example at the use of industrial robots in foundries, where for example cooling liquid and lubricant may have to be transferred in the swivel connector. A marked productivity increase may result.

BRIEF DESCRIPTION OF THE DRAWING

The invention will be described in further detail below under reference to the accompanying drawing, in which.

DETAILED DESCRIPTION OF A PREFERRED EMBODIMENT

Figure 1:
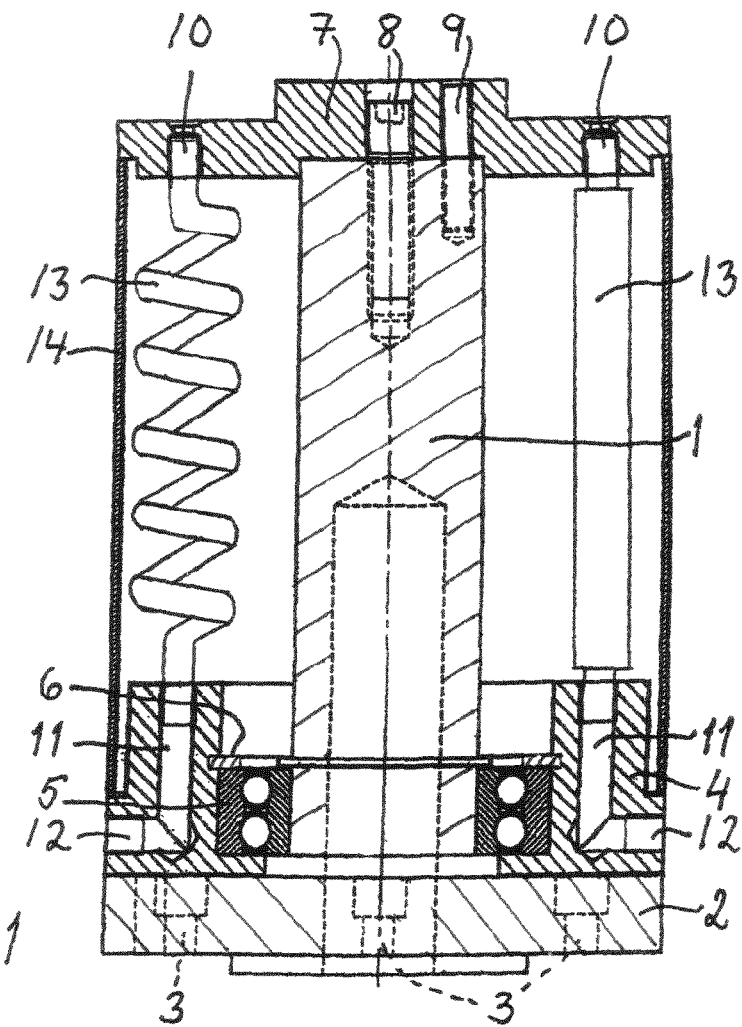
FIG. 1 is cross section through a swivel, for example for an industrial robot.
Figure 2:
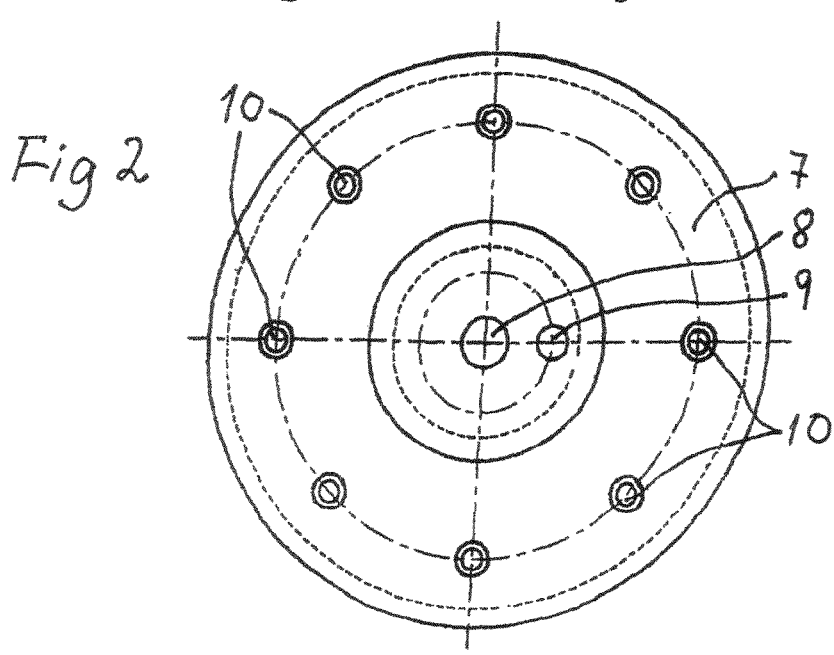
FIG. 2 is a plan view of this swivel.

A swivel for example for an industrial robot is shown in the drawing.

A central shaft 1 is attached to a base plate 2, which has screw holes 3 for its mounting to further parts (not shown) of the robot.

A lower connection ring 4 is rotatably journalled in relation to the shaft 1 by means of a bearing 5, held in position by a spring ring 6.

A cover 7 forming an upper connection is attached to the shaft 1 by means of a central screw 8. Alternatively, a quick-coupling may be used for this purpose, which is an advantage in a service situation. The angular position of the cover 7 in relation to the shaft 1 can be set by a pin 9 in corresponding holes in the shaft 1 and the cover 7.

The cover 7 is provided with a number of through connection holes 10, in the shown example eight holes, for compressed air, cooling water, lubricant, electric power, or control signals as typical examples of operating or controlling media to be transferred by the swivel.

The lower connection ring 4 is provided with a corresponding number of through connection holes 11, which in the shown example open at 12 in the cylindrical periphery of the connection ring 4.

The upper connection holes 10 of the cover 7 and the lower connection holes 11 of the connection ring 4 are mutually connected by flexible or—as shown—elastically extensible hoses or cables 13 (depending on the medium to be transferred). The hose or cable 13 to the left in FIG. 1 is of the spirally wound type, which is presently preferred. The hose or cable 13 to the right in FIG. 1 is meant to indicate that other types of elastically extensible constructions are possible within the scope of the invention.

If the solution with ordinary flexible hoses or cables 13 is chosen, their length will determine the maximum mutual rotation between the connection ring 4 and the cover 7, normally not exceeding a full revolution.

The hoses or cables 13 may preferably be connected to their respective connection holes 10 and 11 by means of quick-couplings, facilitating mounting and exchange.

A cylindrical housing 14 for enclosing the hoses or cables 13 may be provided. Access to the hoses or cables 13 for service is very easily obtained by removal of the housing 14.

It may be advantageous to limit the mutual rotation in the swivel as shown and described for example to one full revolution or less, and means for this purpose may be provided.

Means for transferring media to and from the connection holes 10 and 12 are not shown, as they do not form any part of the invention.

When used in an industrial robot, the lower connection ring 4 of the swivel as shown and described may be stationary, whereas the shaft 1 with the base plate 2 and the cover 7 may be rotatable (less than one full revolution).

The invention claimed is:
1. A swivel comprising:
a first member;
a shaft fixed to the first member;
a second member mounted for rotation on the shaft, such that the second member is rotatable relative to the first member;

a bearing interposed between the second member and the shaft;

a plurality of media transfer members extending between the first and the second members, wherein the media transfer members are respectively provided at spaced apart locations around the circumference of the shaft; and a base plate rotationally fixed to the shaft and the first member, such that the second member interposes between the base plate and the first member.

2. The swivel according to claim 1, wherein the plurality of media transfer members includes at least one of hoses to transfer fluid media, and cables to transfer electrical media.

3. The swivel according to claim 1, wherein the media transfer members have a spiral shape.

4. The swivel according to claim 1 comprising:

a cylindrical housing extending between the first and the second members and enclosing the plurality of media transfer members.

5. The swivel according to claim 1 comprising:

through holes provided in the first member; and through holes provided in the second member;

wherein each of the media transfer members is connected to one through hole in the first member and one through hole in the second member.

6. The swivel according to claim 1, wherein the first rotatable member is a cover, and the second rotatable member is a connection ring.

7. The swivel according to claim 6, wherein the cover is fixed to the shaft via a quick-coupling.

* * * * *